May 26, 1970  L. R. PADBERG, JR  3,514,749
METHOD AND APPARATUS FOR CONDUCTING SEISMIC
EXPLORATIONS FROM AIRCRAFT
Filed April 24, 1969  2 Sheets-Sheet 1
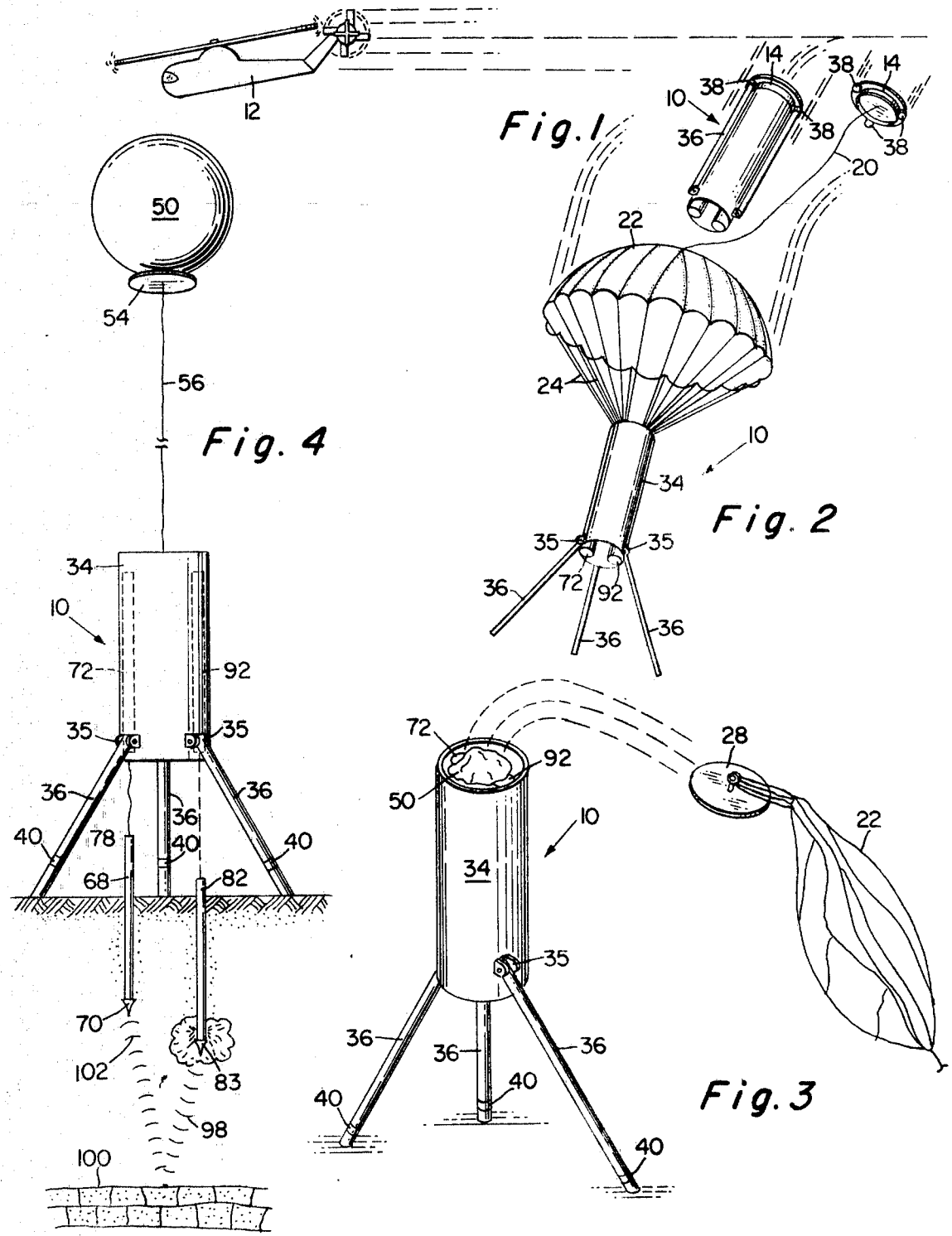
INVENTOR.
LOUIS R. PADBERG JR.
BY Howard J. Murray Jr. AGENT
Q. Baxter Warner
ATTORNEY May 26, 1970     L. R. PADBERG, JR     3,514,749
METHOD AND APPARATUS FOR CONDUCTING SEISMIC
EXPLORATIONS FROM AIRCRAFT
Filed April 24, 1969     2 Sheets-Sheet 2
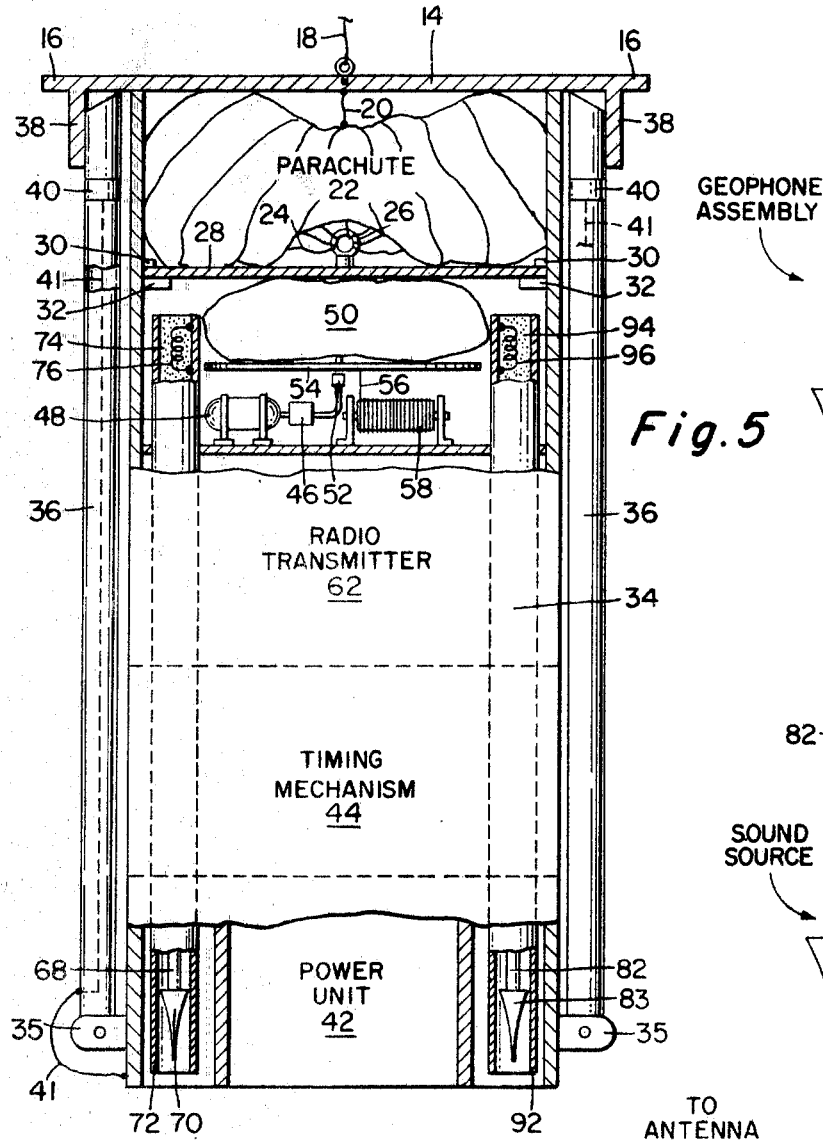
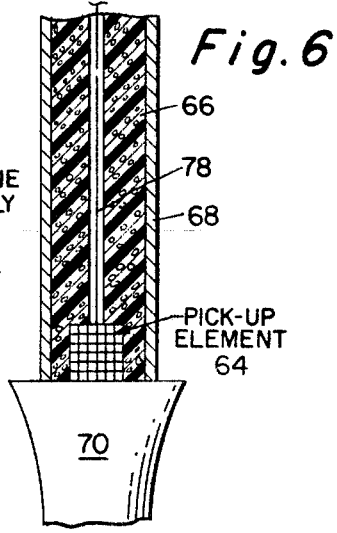
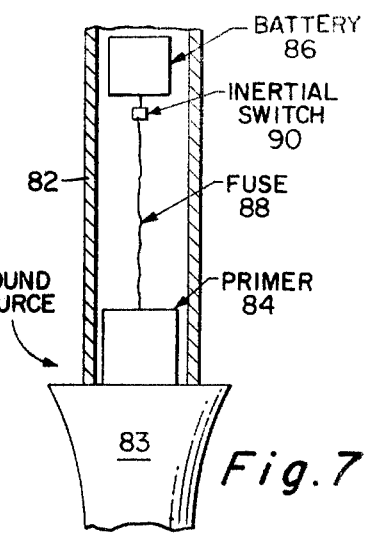
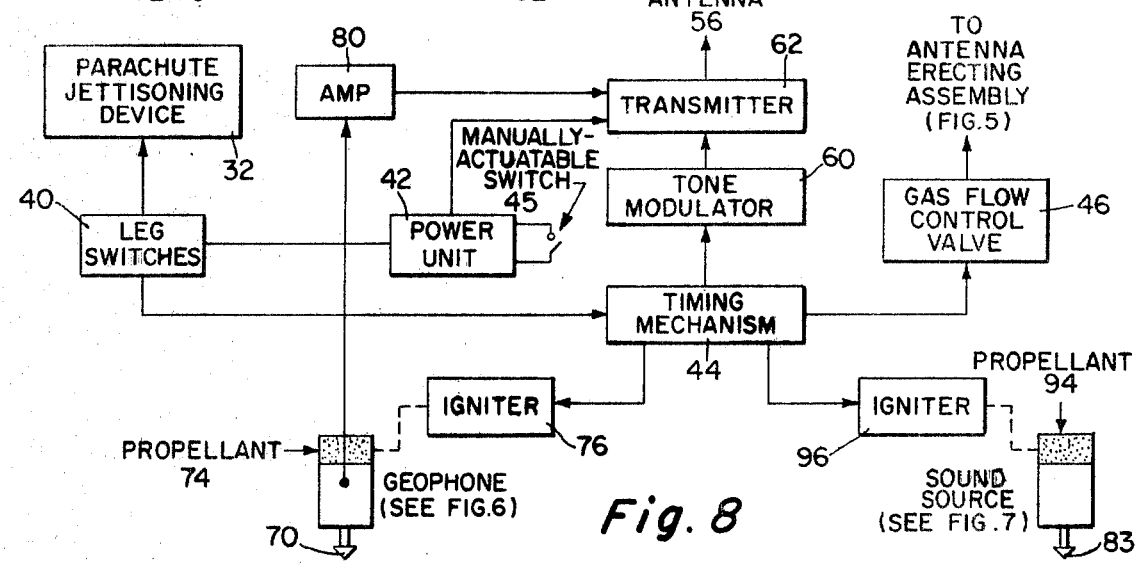

United States Patent Office 3,514,749
Patented May 26, 1970

3,514,749
METHOD AND APPARATUS FOR CONDUCTING SEISMIC EXPLORATIONS FROM AIRCRAFT
Louis R. Padberg, Jr., 22 Rincon Vista Road, Santa Barbara, Calif. 93103
Filed Apr. 24, 1969, Ser. No. 819,057
Int. Cl. G01v 1/10, 1/22
U.S. Cl. 340—15.5                                 10 Claims

ABSTRACT OF THE DISCLOSURE

A method and apparatus for obtaining information as to sub-surface conditions in regions difficult of access by conventional means. An instrumentation package is lowered or dropped from an aircraft, this package including a seismic pick-up sensor together with a selectively-energizable source of acoustic energy. After these members have been embedded into the surface of the landing area, energization of the sound source will generate a high-intensity wave which is reflected back to the sensor from sub-surface discontinuities. A radio transmitter is included in the package for transmitting the derived data to the aircraft or other receiving station.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It is known to employ geophones, sensitive to seismic vibrations, for the purpose of obtaining information as to sub-surface conditions in order to efficiently conduct oil and mineral exploratory operations. These instruments are responsive to low-frequency vibrations passing through the earth, and can readily detect echoes reflected from rock layers and other geological discontinuities such that a fairly accurate picture of underground conditions can be obtained. Such instruments are customarily embedded into the earth by hand, and the data picked up thereby generally observed and/or recorded in the immediate vicinity of the device per se.

In a copending application of the present applicant, Ser. No. 730,679 filed May 17, 1968, there is disclosed an instrumentation package which may be dropped from a helicopter or other low-flying aircraft. This package contains a parachute which opens to allow the assembly to fall fairly slowly into the tree-tops or other foliage found in tropical regions. Following this termination of parachute descent, means are provided for expelling downwardly a pointed rod on which the geophone is carried, the rod embedding itself into the ground to form an excellent pick-up for the geophone attached thereto. Vibrations detected by this device are conducted by wire to a radio transmitter which has remained with the parachute, and this transmitter broadcasts the data so derived to a receiving station located in the aircraft or elsewhere.

An assembly constructed in accordance with the above is especially suitable for detecting the presence of individuals in caves or subterranean chambers where their movements produce low-frequency earth vibrations which can be picked up at a considerable distance from the point of origin. However, such a device is of a completely "passive" type in that no output is obtained in the absence of some production of acoustic energy at a point remote from the geophone itself. Furthermore, since the time of occurrence of any particular vibratory wave is not known, no accurate data can be derived as to the distance of the sound source from the pick-up point. Consequently, the use of such a device for the purpose of creating a picture of underground conditions in any particular region is generally inadvisable.

SUMMARY OF THE INVENTION

The present concept extends the versatility of an exploratory assembly of the "passive" type by providing an "active" sound source as a part of the instrumentation package dropped or lowered from an aircraft. This sound source is controllable to emit a high-intensity shock wave which serves as a time reference from which can be measured the instant when reflected energy is received by the geophone from a sub-surface discontinuity. The distance of the latter from the sound source is thus more readily determinable. The invention also embraces the establishment of a particular timed sequence for activating the various components of the instrumentation package, so that each component is placed in condition to carry out its prescribed function.

OBJECTS OF THE INVENTION

One object of the present invention therefore, is to provide a method whereby an instrumentation package which includes means for conducting seismic explorations may be lowered or dropped from an aircraft into a region difficult of access by conventional means.

Another object of the invention is to provide an instrumentation package of the type described which includes both a seismic pick-up device and a source of high-intensity sound energy.

A further object of the present invention is to provide means included in an instrumentation package of the type described for sequentially embedding both the sound source and the pick-up device into the surface of a region concerning which information is desired.

Other objects, advantages, and novel features of the invention will become apparent from the following detailed description of the invention when considered in conjunction with the accompanying drawings.

BRIEF DESCRIPTION OF THE DRAWINGS

FIGS. 1 through 4 are diagrammatic views illustrating the sequence of events that occur between the time that an instrumentation package designed according to a preferred embodiment of the present invention is dropped from an aircraft and the time that such assembly is in condition to yield the information desired therefrom;

FIG. 5 is an enlarged side view, partly broken away, of a preferred form of instrument package of the nature illustrated in FIGS. 1 through 4;

FIGS. 6 and 7 are enlarged side views, partly in section of portions of certain components included in the assembly of FIG. 5; and FIG. 8 is a primarily electrical block diagram of apparatus included in the assembly of FIG. 5.

DESCRIPTION OF THE PREFERRED EMBODIMENT

Referring now to the drawings, there is illustrated in FIGS. 1 through 4 a preferred method through the practice of which the objectives sought by the present concept may be achieved. In carrying out this method the particular apparatus described herein has been found to be especially suitable, but it will be appreciated that the invention is not limited to any specific means for its operation. The following description is consequently intended to be merely exemplary in nature.

An instrumentation package, generally designated by the reference numeral 10, is dropped as shown in FIG. 1 from a helicopter 12 or other aircraft flying low over a region of interest. Usually, this region will be one which is difficult of access by conventional means, such as a remote desert, jungle or polar area, and as to which there is an interest regarding its sub-surface conditions.

The package 10 is of generally cylindrical configuration, one end being closed by a cap 14. This cap 14 may be flanged (as best shown at 16 in FIG. 5) so that, when the package descends, air pressure against this flange 16 causes the cap to become separated from the remainder of the package (FIG. 2). Alternatively, a lanyard 18 (illustrated only in FIG. 5) one end of which is secured to the fuselage of aircraft 12, may be employed to jerk the cap 14 from package 10 soon after the latter is dropped.

The cap 14 is connected by a further lanyard 20 to a parachute 22 contained within the instrumentation package 10. When the cap 14 is forced off the end of package 10, the parachute is pulled out of the package by the lanyard 20 and opens as shown in FIG. 2. The shroud lines 24 of the parachute lead to a ring 26 carried on a plate 28 located within package 10 as shown in FIG. 5. This plate 28 is normally held in position by a plurality of detents 30, but is ejectable from package 10 upon energization of a jettisoning device, schematically designated in FIG. 5 by the reference numeral 32, which will be further described in connection with the electrical diagram of FIG. 8.

Pivotally attached by spring hinges 35 to the body 34 of the instrumentation package 10 are three or more legs 36 which are biased to a landing position as shown in FIGS. 2, 3 and 4. These legs 36 are folded back against the body 34 of the assembly (as shown in FIG. 1) when the latter is dropped from the aircraft 12, being retained in place by the cap 14, the latter having three cup-shaped ears 38 into which the ends of the legs 36 are respectively receivable as illustrated in both FIGS. 1 and 2.

The package 10 now lands on the surface of the region to be investigated (FIG. 3). Since the parachute 22 is no longer needed, it is disposed of by jettisoning the plate 28. For a description of the manner in which this is accomplished, reference is made to FIGS. 5 and 8 of the drawings.

Each of the legs 36 may contain a pressure-activated switch 40 near the foot thereof. These switches are serially-connected by conductors (partially shown at 41) to a power unit 42 and thence to both the parachute-jettisoning device 32 and a timing mechanism 44. The power unit 42 has been activated or armed by closing of a manually-operable switch 45 prior to the time the package 10 is dropped from aircraft 12. When all three switches 40 have been closed upon landing of the instrumentation package 10, the device 32 is activated to jettison the parachute 22 as illustrated in FIG. 3. Operation of a timing mechanism 44 is also initiated (see FIG. 8).

The timer 44 is designed so that, approximately three minutes after landing, an electro-mechanical valve 46 is opened to admit pressurized gas from a container 48 into a balloon or inflatable bag 50 through a separable check valve 52. Connected to the stem of the balloon 50 is a plate 54 to which is attached one end of an antenna wire 56 wound on reel 58. When the balloon is fully inflated by gas from container 48, it rises as shown in FIG. 4 to extend the antenna wire to a length of about 25 feet, or for a distance sufficient to radiate energy in a manner to be set forth hereinafter.

After another short interval of time (about 1 minute) the timing unit 44 energizes a tone generator 60. This device modules a radio transmitter 62 to yield a C-W tone for radiation from antenna 56 and provides an accurate "fix" on the package 10 from any point within range.

The above sequence of operation has now reached a point where a geophone sensor 64 is to be embedded below the surface of the landing area. The sensor, or pick-up element per se, is encapsulated within some suitable potting or sound insulating compound 66 contained within a tubular shaft 68, as shown in FIG. 6. The shaft 68 is provided with a sharp pointed head 70, preferably composed of lead, designed for maximum penetration into the substance on which the package 10 rests.

The shaft 68 is enclosed within an open-topped tube 72 located within the body 34 of the instrumentation package (see FIG. 5). The upper end of this tube is filled with a suitable propellant 74 into which extends an explodable bridgewire or igniter 76 designed to receive a pulse of high-intensity current from power unit 42 when such action is called for by the timer 44. Detonation of the propellant 74 drives the geophone assembly of FIG. 6 out of the tube 72 and downwardly into the sub-surface material of the landing area, as shown in FIG. 4. An output wire 78 connects the pick-up element 64 to an amplifier 80 (FIG. 8) associated with the transmitter 62, so that the latter can broadcast from antenna 56 data picked up by the member 64 during operation of the invention apparatus. Since the tubes 72 and 92 are open-topped, very little recoil force is generated when the propellants 74 and 94 are ignited, and hence there is negligible danger of the package 10 being upset when the geophone and sound source are driven out of their respective tubes 72 and 92.

Since the present system is an "active" rather than a "passive" one, means are provided for producing a high-intensity shock wave serving as a source from which the time of receipt of reflections can be measured.

One preferred form of sound source is illustrated in FIG. 7 of the drawings. It is somewhat comparable structurally to the geophone assembly of FIG. 6 in that it includes a hollow shaft 82 terminating in a pointed head 83. However, within the shaft 82 is carried an explosive charge or primer 84, a battery or power source 86, and a time delay fuze 88 connecting the explosive charge 84 to the battery 86 through an inertial switch 90.

The shaft 82 is enclosed within a tube 92 in a manner similar to that of the geophone assembly. Also similar is that the upper end of tube 92 is filled with a suitable propellant 94 into which extends an explodable bridgewire or igniter 96 designed to receive a pulse of high-intensity current from power unit 42 through the timer 44. Detonation of the propellant 94 drives the sound source of FIG. 7 out of the tube 92 and downwardly into the sub-surface material of the landing area in a location adjacent to the geophone assembly, as shown in FIG. 4.

The sudden positional displacement which takes place when the sound source of FIG. 7 is driven into the sub-surface of the landing area in the manner above described closes the inertial switch 90. This arms the fuze 88 from battery 86, and after a predetermined period of time the explosive charge 84 is detonated to create a shock wave in the substance where the geophone assembly is embedded, as shown in FIG. 4. The shock waves 98 radiating from this source strike a sub-surface discontinuity 100 and are reflected back as shown at 102 to the geophone pick-up element 64. Since the latter receives both the initial shock wave resulting from detonation of the explosive charge 84 as well as the reflected waves 102, the time displacement therebetween can readily be measured at any receiver within range of the signals transmitted from antenna 56. Such time displacement is a measure of the depth of the sub-surface discontinuity 100.

Instead of dropping the instrumentation package 10 from the aircraft 12, it can be lowered in tethered fashion from a helicopter. In such a case, the parachute and its jettisoning device are obviously unnecessary. Some flexible strain-relieving device can advantageously be substituted therefor if desired.

The invention method and apparatus are particularly suitable for determining the thickness of ice in arctic or antartic regions even under extremely severe weather conditions, since no individual attendance during an exploratory operation is necessary. All of the functions are performed automatically and in pre-timed sequence, the derived information being broadcast to any remote receiving point within range of the transmitter 62.

Since the instrumentation package 10 contains components which are rather expensive to fabricate, it is contemplated that such package be recoverable by a helicopter having a V-shaped pick-up member attached to the end of a long cable. This member is lowered to "snag" the plate 54 in its V-shaped recess, after which the assembly 10 can be raised, the wire 78 separating at a plug connection or breaking off in the process. Since both the geophone and sound source are expendable, they may be left buried below the surface.

I claim:

1. An instrumentation package designed to be released from an aircraft flying over a region difficult of surface access in order to obtain information as to sub-surface conditions in such region, said package having support means associated therewith for maintaining the package out of contact with the surface of said region after the package has completed its descent following release from said aircraft, said package including:

a timing mechanism activated when said package reaches the surface of the region concerning which information is sought;

a seismic pick-up device normally enclosed within said package;

a detonatable source of high-intensity acoustic energy also normally enclosed within said package;

means controlled by said timing mechanism and operating approximately a predetermined period of time after said package has reached the surface of said region for ejecting said seismic pick-up device from said package so that said device becomes embedded below the surface of said region;

means also controlled by said timing mechanism and operating approximately a predetermined period of time following operation of said last-mentioned means for ejecting said acoustic energy source from said package so that said energy source becomes embedded below the surface of said region;

means for detonating said acoustic energy source following the ejection thereof from said package;

whereby detonation of said acoustic energy source will create vibrations below the surface of said region, which vibrations are picked up by said seismic device both directly and after reflection from one or more sub-surface discontinuities; and means for transmitting from said package signals representative of the vibrations picked up by said seismic device.

2. The combination of claim 1 in which said seismic pick-up device is a geophone.

3. The combination of claim 1 in which both the means controlled by said timing mechanism for ejecting said seismic pick-up device and the means controlled by said timing mechanism for ejecting said acoustic energy source comprises an explosive charge, a primer embedded therein, and an electrical circuit connecting said primer to said timing mechanism.

4. The combination of claim 1, further comprising a parachute detachably connected to said instrument package for controlling the descent thereof following release from said aircraft.

5. The combination of claim 4, further comprising means forming part of the support means for said package for detaching said parachute therefrom after said package has completed its descent.

6. The combination of claim 5 in which said support means includes a plurality of legs attached to said package in the form of a tripod, said means for detaching said parachute including a pressure-actuated switch associated with at least one of said plurality of legs.

7. The combination of claim 1, in which said means for transmitting from said package signals representative of the vibrations picked up by said seismic device includes a radio transmitter and an antenna electrically connected thereto.

8. The combination of claim 7 in which said antenna is contained within said package during descent of the latter following release from said aircraft, said antenna being extendable from said package after operation of said means for detaching said parachute.

9. In an instrument package designed for release from an aircraft in order to conduct sub-surface exploratory operations in a remote region, said package containing:

a time-controllable source of shock waves;

a seismic device sensitive to the reception of shock waves;

both said shock wave source and said seismic device being ejectable from said package to a position below the surface of said region after said package has completed its descent from said aircraft; and means for transmitting from said package signals representative of any shock waves received by said seismic device.

10. A method of obtaining information as to sub-surface conditions in a region difficult of normal access, said method comprising:

releasing from an aircraft flying over such region an instrument package containing a geophone, a controllably-operable sound source, and a signal transmitter;

ejecting both said geophone and said sound source from said package and into a position below the surface of said region after said package has completed its descent following release from said aircraft;

controlling said sound source to result in operation thereof after it has reached a sub-surface position; and transmitting from said package signals representing the output of said sound source as picked up by said geophone.

References Cited

UNITED STATES PATENTS 3,062,315   11/1962   Herzog _____ 181—0.5

RODNEY D. BENNETT, JR., Primary Examiner

D. C. KAUFMAN, Assistant Examiner

U.S. Cl. X.R.

181—0.5